United States Patent

[11] 3,610,508

[72] Inventor Gunther Laubmeyer
Arolsen/Waldeck, Germany
[21] Appl. No. 806,853
[22] Filed Mar. 13, 1969
[45] Patented Oct. 5, 1971
[73] Assignee Zeva-Elektrizitats-Gesellschaft Smits und Laubmeyer K.G.
Arolsen, Germany
[32] Priority Mar. 13, 1968
[33] Germany
[31] P 16 52 852.2

[54] SOLDERING APPARAUS
8 Claims, 8 Drawing Figs.

[52] U.S. Cl. .......... 228/8, 29/493, 29/502, 228/4, 228/44, 228/56.5
[51] Int. Cl. .......... B23k 1/00, B23k 5/00
[50] Field of Search .......... 228/3, 4, 8, 9, , 56.5, 51, 59; 29/470, 470.1, 493, 497.5, 498, 502; 116/129, 124; 73/16

[56] References Cited
UNITED STATES PATENTS

| | | | |
|---|---|---|---|
| 3,205,572 | 9/1965 | Jochems | 29/498 X |
| 3,256,598 | 6/1966 | Kramer et al. | 29/498 X |
| 3,374,531 | 3/1968 | Bruce | 29/498 |
| 3,457,386 | 7/1969 | Costello | 29/498 X |
| 3,461,542 | 8/1969 | Schoenthaler | 29/470.1 |

*Primary Examiner*—John F. Campbell
*Assistant Examiner*—R. J. Craig
*Attorney*—Christen and Sabol

ABSTRACT: An apparatus for soldering together tinned components is arranged to detect the progress of a soldering operation as a function of the movement together of the parts to be soldered and, in accordance with such movement switches off the supply of heat to the position of soldering or operates a time measuring device.

Inventor:

GÜNTHER LAUBMEYER

Inventor:

GÜNTHER LAUBMEYER

INVENTOR

GÜNTHER LAUBMEYER

BY

ATTORNEY

SOLDERING APPARAUS

The present invention relates to apparatus for soldering and more particularly to forms of such apparatus adapted for soft soldering on very thin metal layers in electrical equipment using thin and thick layers or films as leads.

While 20 years ago electric and electronic equipment was provided with soldered connecting wires having a thickness of 0.4 to 1.0 mm., at the present time generally accepted printed circuits make use of conducting paths or tracks which are only 0.035 mm. in thickness. At the beginning of the development of printed circuit technology there was the difficulty that the conducting paths dissolved to a greater or lesser extent in the solder being applied so that electrical discontinuities resulted. Although special solders were rapidly developed which could be used at a low temperature in order to prevent any excessive solution of the copper of the printed circuit, it was found that the tendency of the copper to dissolve varied from one point on a printed circuit to an other. Even use of different fluxes and different types of solders did not lead to an evenness in the speed of solution being achieved. These disadvantages were put up with providing that the copper was not completely dissolved anywhere in the circuit.

Thin films as used in modern technology for conducting paths are frequently produced by condensing metals under a high degree of vacuum with the use of masks to achieve the configurations required. The thickness of the metal conducting paths so produced has a value of approximately 1$\mu$. With such thin films the danger of solution on soldering is an extremely real one; it is practically impossible to produce soldered joints of consistent quality on such conducting paths.

One object of the invention is to provide an apparatus for soldering such conducting paths while avoiding the dangers which are mentioned above.

For the production of soldered joints of the type with which the invention is more particularly concerned at least one of the two parts to be joined is already tinned with soldering alloy before soldering is carried out. On the application of the heat used for soldering the comparatively thick tin layer or layers (having a thickness of 20 to 40$\mu$) fuse together. When the source of heat is switched off they solidify as a single-fused body. In such a soldering operation the tinned part are moved together through a distance which at the most is equal to the thickness of the tinned layer, or the sum of the thicknesses of the two tin layers, as the case may be. In practice the amount of travel of the parts towards one another amounts of about 50 percent of the maximum possible travel.

In apparatus, to be described below, embodying the invention this movement together of parts during soldering is used in order to switch off a source of heat at the appropriate time, that is to say when there is sufficient initial diffusion of metal at the one or more soldered joints being produced.

The present invention consists in an apparatus for soldering together two parts of which at least one is tinned, comprising resilient means for pressing together the parts to be soldered, means for supplying heat to the parts to be soldered, and means responsive to initial movement of the parts to be soldered together and serving for switching off the means for heating the parts to be soldered. Apparatus in accordance with the invention can thus be arranged to terminate the soldering operation when it has proceeded sufficiently far to produce a satisfactory soldered joint but has not yet led to excessive solution of thin conducting paths or other metal parts in the liquid solder.

A further advantage of apparatus in accordance with the invention is that of evenness in the quality of the soldered joints produced. It has been found that the heat requirement per soldered joint varies because, for example, the tin layers are not usually of constant thickness. Furthermore the surfaces which are to be soldered together vary in area. Thus even assuming that the heat source of a soldering apparatus always develops heat at the same rate, there are variations in the amount of time required for heating up which may be as great as 30 percent in the case of thick metallic films and as great as 60 percent in the case of thin ones, so that as a result time switching or temperature switching means can never lead to consistent quality in soldering.

Apparatus in accordance with the invention has been found particularly successful for soldering very thin metal layers, for example of gold, applied by condensation. During soldering gold dissolves so rapidly in the solder that an interruption in the soldered joint is produced. Apparatus in accordance with the invention has been successfully used for producing soldered joints on gold layers only a fraction of a micron in thickness using normal tinlead solder without any excessive solution of the gold occurring. This is because soldering under the application of pressure occurs even below the melting point of the solder owing to diffusion. At this temperature undesired solution of the thinest metal layers, deposited by condensation, is not possible.

The means used in the apparatus for detecting the beginning of the movement of the two parts to be soldered toward one an other, due to diffusion at a temperature below the melting point of the solder, can be in the form of a conventional clock-type gauge. The means for switching off the source of heat after the beginning of a decrease in the distance between the parts to be soldered can operate photoelectrically, capacitively or inductively for responding to the indication of the gauge and giving a signal for switching off the source of heat. For example use can be made of a device which interrupts or ceases to interrupt a light beam, when the gauge responds, and switches off the source of heat. An alternative means for detecting the movement together of the parts to be soldered comprises a movable, for example pivotally mounted, metal plate forming part of an air-insulated condenser whose capacity is changed and the gauge responds and causes a switching off of the source of heat.

Since the distance through which the parts move when soldering occurs is extremely small and the pressure applied must not be allowed to increase arbitrarily, a vibrator or buzzer, for instance similar to a bell buzzer, can be provided in order to prevent any slight jamming of the gauge. By switching on such a buzzer during heating up, the least jamming of the gauge is avoided and the registration of the initiation of the soldering movement is extremely precise. Preferably an electronic timing means or a frequency counter can be connected in parallel with the buzzer in order to provide a means of checking the course of various factors during soldering.

Further features of the invention and possibilities opened up by it will now be described with reference to the accompanying drawings.

Figure 1:
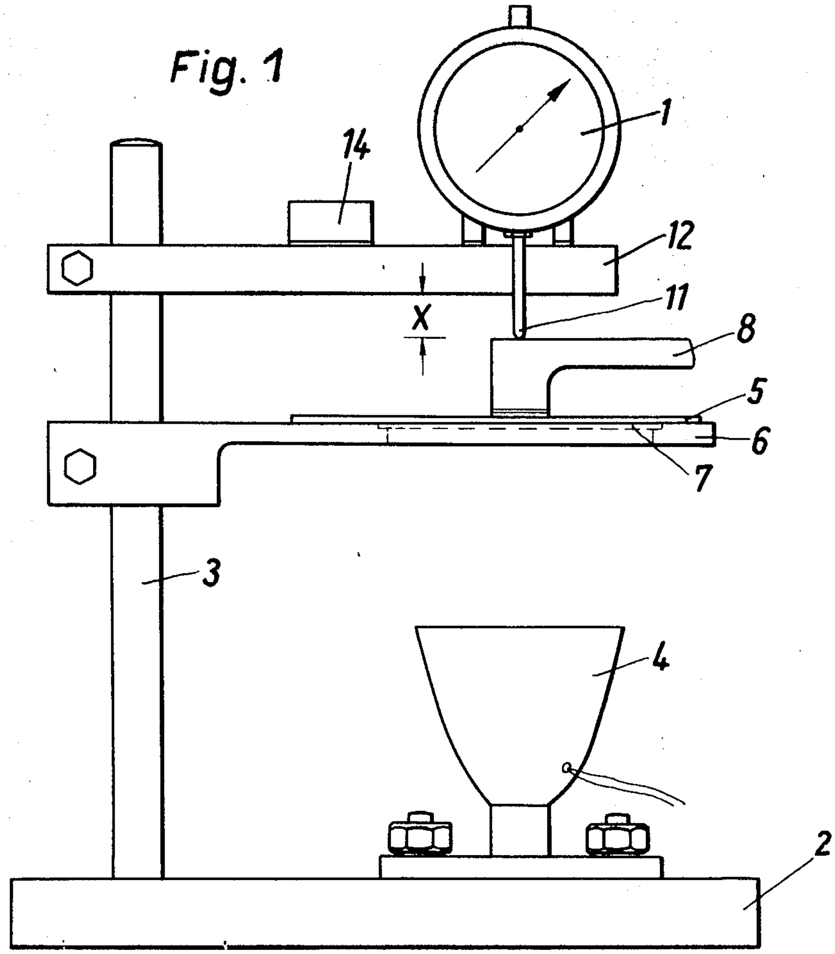
FIG. 1 is a diagrammatic view of one form of apparatus incorporating the invention.

Referring now to the drawings and more particularly to FIG. 1, it will be seen that one form of my apparatus comprises a dial-type gauge 1 which is mounted on a bracket or support 12 which can be adjusted as to height by means of a precision setting arrangement. The support 12 is attached to a column 3 mounted on a base part 2. The support 12 carries the means 14 for producing vibrations which prevent any slight jamming of the gauge during soldering of a printed circuit 5.

Circuit 5 with electrical conductors is placed on a glass plate 7 mounted in an opening in a support table 6. As a source of heat use is made of a halogen lamp 4.

Figure 2:
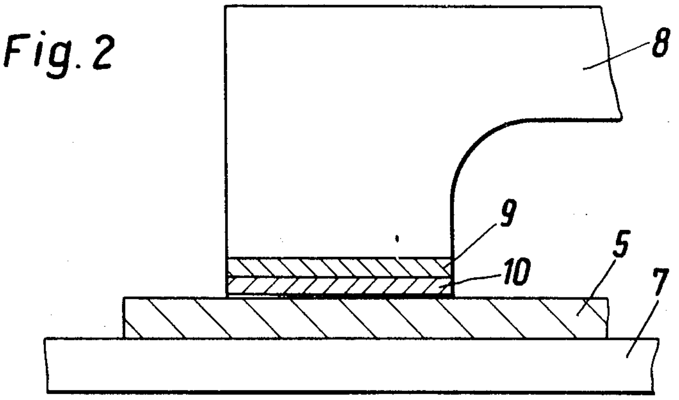
FIG. 2 is a diagram illustrating the making of a soldered joint.

FIG. 2 shows part of a miniature component 8, considerably enlarged, which is to be soldered in position. The path or track of the printed circuit or the lug of the component 8, or both, are tinned. The tin layer 9 of the component 8 and the tin layer 10 on the printed circuit 5 are applied at low temperatures, that is to say a few degrees above the melting point. The thickness of each of the tin layers 9, 10 is 15 to 40$\mu$. The tinned lug of the component 8 and the tinned path of the printed circuit are laid on top of one an other and pressed together resiliently by means of a sensing anvil or plunger 11 until the measuring gauge registers a reading of 300 to 500$\mu$. The value is noted precisely. The position of the joint is then heated with the halogen lamp 4 which is suitably focused. The halogen lamp is controlled in accordance with voltage and time.

As the tin layers approach their melting point or slightly exceed it and diffusion soldering begins so that the tin layers become joined together, the hand of the dial gauge will register a displacement from the initial value of about 20$\mu$. This movement corresponds to an increase in the distance $x$ of the component 8 from the gauge and the lower surface of the support 12. In accordance with this displacement of the hand of the gauge, the halogen lamp, that is to say the source of heat, is switched off. The means responsive to the movement of the hand can for example comprise a selenium cell which operates a relay circuit controlling the supply of current to the halogen lamp. Alternatively the movement of the hand of the gauge, or a similar indicating instrument, can move a metal plate of an air condenser and, owing to a change in the characteristic of the condenser bring about an immediate switching off of the electrical supply of the heating means. Similarly an inductive means can be used corresponding to operation of the gauge and switching off the source of heat. It is by no means necessary to use a focused halogen lamp. Such a lamp is only shown by way of example. Other means of heating can be used.

Figure 3:
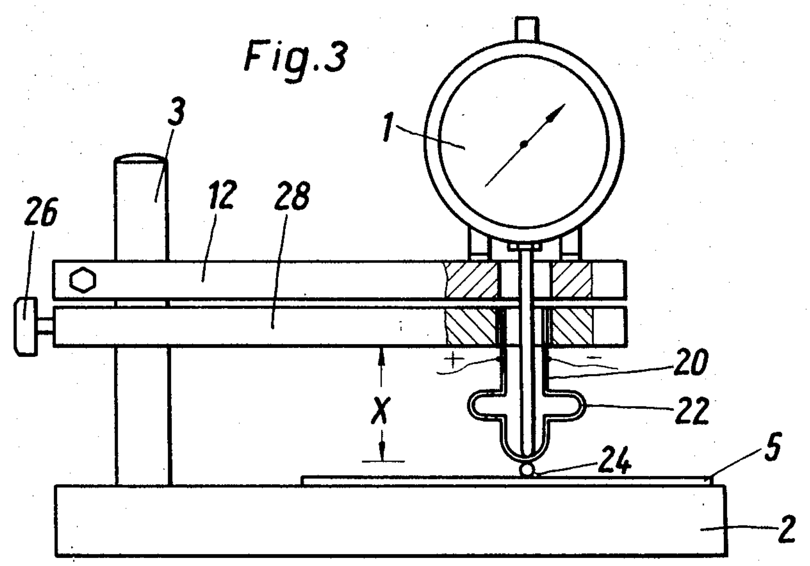
FIG. 3 is a diagrammatic view of a further embodiment of the invention.
Figure 4:
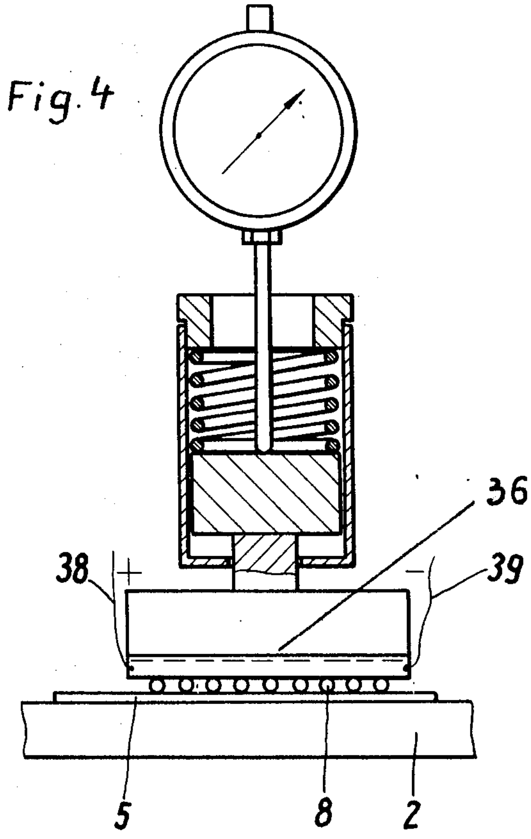
FIG. 4 is a view of a still further embodiment of the invention.
Figure 5:
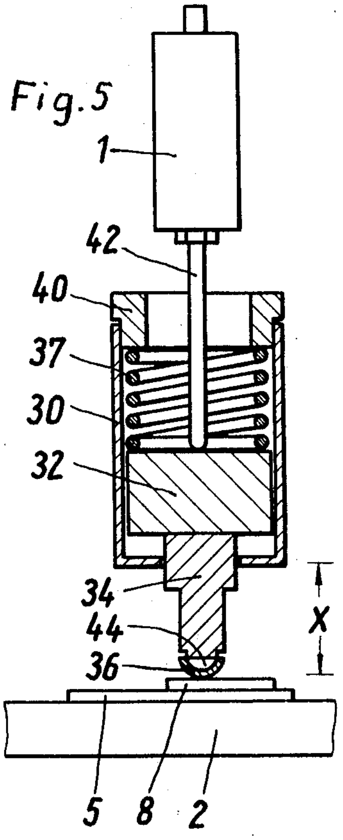
FIG. 5 is a side view of the apparatus shown in FIG. 4.

Examples of such forms of apparatus are shown in FIGS. 3, 4, and 5 diagrammatically. These forms of apparatus are designed to provide for a high degree of reliability in soldering integrated components on printed circuits, in which five and more connections are often soldered together in flat-pack constructions. As a heat transmission means use is made of a resilient heating tape or band 20 having the shape of a letter U as shown in FIG. 3. The limbs of the tape are provided with resilient curved parts 22 which provide a soldering pressure. The heating band 20 is mounted on a support 28 which can be adjusted as to height by means of a rotary knob 26 on the column 3. The heating tape is operated by means of low-voltage current. The measuring gauge is also attached to a support 12, which can be adjusted as to height, on the column 3, the arrangement being similar to that shown in FIG. 1. The support 12 is preferably also provided with a vibrator or buzzer (not shown). The buzzer can also be provided on the support 28. The gauge 1 is arranged to contact the heating tape 20 at its lowermost position above its zone of contact with the components 8 and 5 to be joined together by soldering. At the time at which soldering occurs the distance $x$ of the soldering zone 24 of the heating tape from support 28 and from the gauge increases. Owing to this displacement the gauge interrupts the soldering heat. The gauge responds to the duration of soldering until soldering is completed always in the same condition and brings about interruption of soldering heat at this time. The rotary knob 26, which is connected with a worm drive, makes possible an adjustment of the force exerted by the resilient heating tape on the parts to be soldered.

The material of the heating tape or band is preferably one which cannot be soldered or can only be tinned with difficulty, for example a beryllium-nickel-chrome alloy. The tape has a spring force which is practically constant irrespective of a rise in temperature. There are a number of similar alloys which cannot be tinned or they can only be tinned with difficulty.

FIGS. 4 and 5 are two views of a further form of apparatus in partial section. The directions in which the views are taken are angularly offset by 90°. The apparatus shown makes use of an electrically heated metal tape or band 36 as a soldering tool. The band itself is not resilient but is carried by a spring-loaded holding device comprising a cylindrical housing 30 in which a metal plunger 32 is mounted for vertical movement by means of ball bearings (not shown) so as to reduce friction. A porcelain part 34 is attached to the bottom end of the plunger and on its tip carries the above-mentioned soldering band 36 which is heated via electrical leads 38 and 39 during soldering. The heating tape or band is mounted on the tip portion of the porcelain part 34 so as to leave a gap 44 and to substantially restrict transmission of heat to the part 34. The metal band quickly cools when the heating current is interrupted. The plunger part 32 is loaded by a spring 37 (though it is alternatively possible to use a weight) whose biassing force can be adjusted by means of a nut 40. The sensing anvil 42 of the gauge 1 contacts the top surface of the plunger 32. As was the case with the apparatus shown in FIG. 3, the plunger soldering unit generally denoted by reference numeral 30 is carried by means of the vertically adjustable support 28 with a setting knob 26. The arm is mounted on the column 3. The gauge 1 is carried by means of the support 12 which is also carried by the column 3.

For carrying out a soldering operation the printed circuit 5 is laid on the base part 2 of the stand. The component 8 is placed on it in position and the soldering tape or band 36 is moved into the soldering position. In this position a suitable setting of the biassing force of the helical spring 37 and/or the vertical height of the support 28 is carried out in order to apply sufficient force to the parts to be soldered. The anvil 42 of the gauge 1 is brought into contact with the plunger 32. After switching on current via leads 38, 39, the heating current flows through the heating band from the leads 38 and 39. Owing to movement of the parts 5 and 8 together owing to the initiation of soldering due to diffusion of the tin solder below its melting point the heating means moves downward slightly so that the distance $x$ is increased and the gauge is caused to respond owing to movement of the anvil 42. The movement of the hand of the gauge is sufficient to switch off the soldering current.

Figure 6:
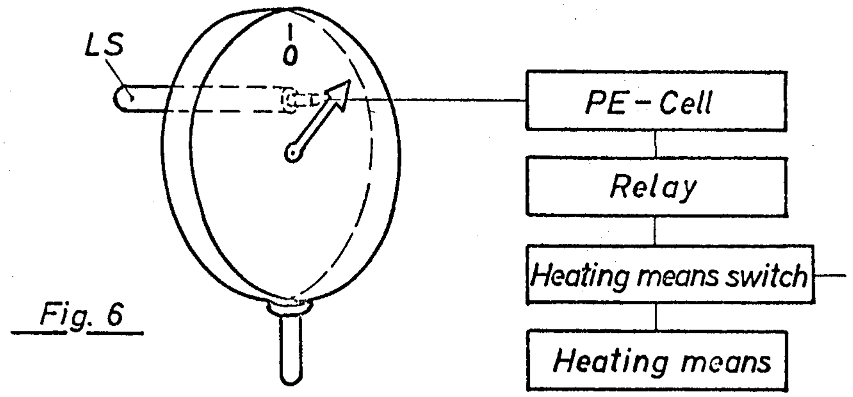
FIGS. 6 to 8 are diagrammatic representations of further embodiments of the invention.

Switching means for an apparatus in accordance with the invention is diagrammatically illustrated in FIG. 6 of the accompanying drawings.

In this form of the apparatus the heating means is supplied via a heating means switch which can be controlled by a relay.

Figure 7:
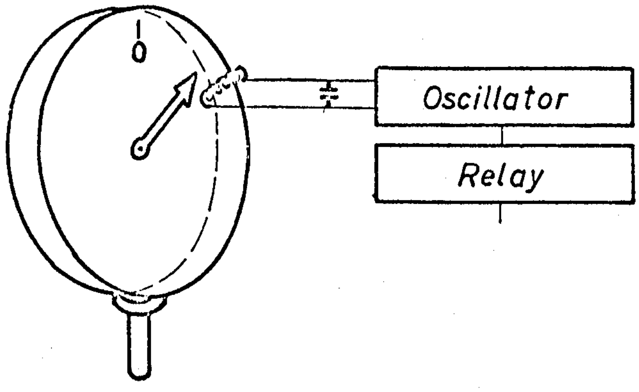

FIG. 7 shows an alternative arrangement for detecting movement of the dial hand of the gauge. In this case a coil is arranged over the path of the hand of the dial gauge. The coil is connected parallel with a capacitor and both are connected with an oscillator. When the hand of the gauge moves into a given position owing to relative movement between parts to be soldered, the hand comes into a position in which it varies the inductance of the coil so that the frequency of the oscillators is changed and the oscillator produces a pulse which operates the relay. The rest of the apparatus can be as shown in FIG. 6.

Figure 8:
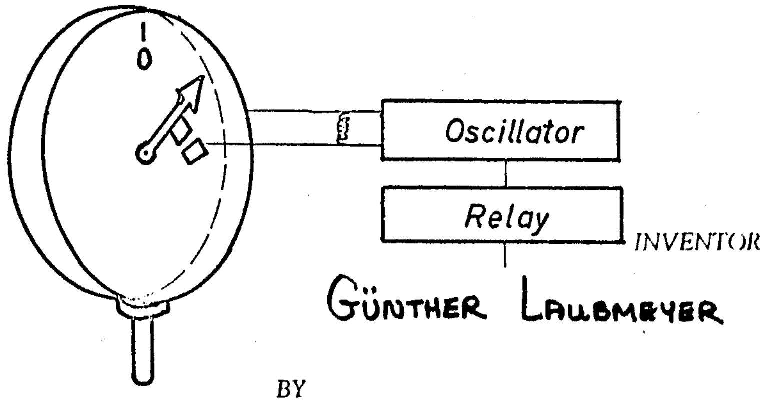

FIG. 8 shows a further alternative form, similar to the arrangement shown in FIG. 7 but having a coil of fixed inductance connected with the oscillator. One terminal of the coil is connected with the housing of the gauge and thus with the metallic hand of the gauge. The other terminal of the coil is connected with a plate lying parallel to the face of the gauge. The hand also carries a plate. When the two plates come to overlap each other they constitute a capacitor which forms a reactive circuit with the coil. The oscillator then responds and produces a pulse which operates the relay. The rest of the arrangement can be as shown in FIG. 6.

The embodiments of the invention as shown in FIGS. 1, 6, 7, and 8 can employ an internal spring in the dial-type gauge for pressing the parts to be soldered together.

What I claim is:

1. An apparatus for soldering together two parts of which at least one is tinned, comprising resilient means for pressing together the parts to be soldered, means for supplying heat to the parts to be soldered, and means responsive to movement of the parts to be soldered together towards each other and serving for switching off the means for heating the parts to be soldered when the parts to be soldered together have approached each other within a distance amounting to at least 50 percent of the thickness of the original tin layer separating said part.

2. An apparatus in accordance with claim 1, comprising a gauge responsive to relative movement between parts to be soldered, and means for providing an electrical signal for stopping heating of the parts to be soldered when the gauge reaches a preset reading.

3. An apparatus in accordance with claim 2, comprising photoelectric means for giving a signal when the gauge reaches the preset reading.

4. An apparatus in accordance with claim 2, in which the gauge is arranged to move a metal plate, and the apparatus comprises a condenser part cooperating with the metal plate in providing a condenser whose capacity depends upon the position of the hand, and electronic circuit means for giving a signal when the capacity of the condenser reaches a preset value.

5. An apparatus in accordance with claim 1, comprising a gauge for indicating relative movement between the parts to be soldered, and vibrating means for acting on the gauge.

6. An apparatus in accordance with claim 1, comprising a resiliently acting metal band for pressing parts to be soldered together.

7. An apparatus in accordance with claim 6, in which the band has the shape of a letter U, the limbs of the band having resilient bends in them for exerting a pressing action on the two parts to be soldered.

8. An apparatus in accordance with claim 1, comprising timing means for indicating the time elapsing from the initiation of heating for soldering and the beginning of relative movement between the two parts to be soldered.